United States Patent
Hanson et al.

(10) Patent No.: US 9,741,379 B1
(45) Date of Patent: Aug. 22, 2017

(54) METHODS AND DEVICES FOR TRACK SEEKING USING MICROACTUATORS

(71) Applicant: Seagate Technology LLC, Cupertino, CA (US)

(72) Inventors: Reed D. Hanson, Chaska, MN (US); Kenneth A. Haapala, Plymouth, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/099,383

(22) Filed: Apr. 14, 2016

(51) Int. Cl.
*G11B 21/02* (2006.01)
*G11B 5/55* (2006.01)
*G11B 20/18* (2006.01)

(52) U.S. Cl.
CPC .......... *G11B 5/5547* (2013.01); *G11B 5/5556* (2013.01); *G11B 20/18* (2013.01)

(58) Field of Classification Search
None
See application file for complete search history.

(56) References Cited

U.S. PATENT DOCUMENTS

| | | | | |
|---|---|---|---|---|
| 6,013,995 A * | 1/2000 | Kim | ..................... | G11B 21/083 318/561 |
| 7,215,499 B1 * | 5/2007 | Li | ........................ | G11B 5/5547 360/75 |
| 7,283,321 B1 | 10/2007 | Sun et al. | | |
| 7,876,523 B1 * | 1/2011 | Panyavoravaj | .... | G11B 5/59627 360/51 |
| 7,885,033 B2 | 2/2011 | Hanson et al. | | |
| 9,142,234 B1 * | 9/2015 | Lou | ........................ | G11B 5/556 |

* cited by examiner

*Primary Examiner* — K. Wong
(74) *Attorney, Agent, or Firm* — Faegre Baker Daniels LLP

(57) ABSTRACT

A method is disclosed for positioning a transducer over a magnetic recording medium having a plurality of tracks. The method includes positioning the transducer over a first track using a voice coil motor (VCM) and a microactuator. The method further includes applying a feedforward voltage profile to the microactuator to position the transducer over a second track.

20 Claims, 4 Drawing Sheets

METHODS AND DEVICES FOR TRACK SEEKING USING MICROACTUATORS

SUMMARY

A method is disclosed for positioning a transducer over a magnetic recording medium having a plurality of tracks. The method includes positioning the transducer over a first track using a voice coil motor (VCM) and a microactuator. The method further includes applying a feedforward voltage profile to the microactuator to position the transducer over a second track.

A hard drive includes an actuator assembly including an arm; a microactuator coupled between the arm and a transducer; and circuitry configured to position the transducer during a seek operation by applying a feedforward voltage to the microactuator.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
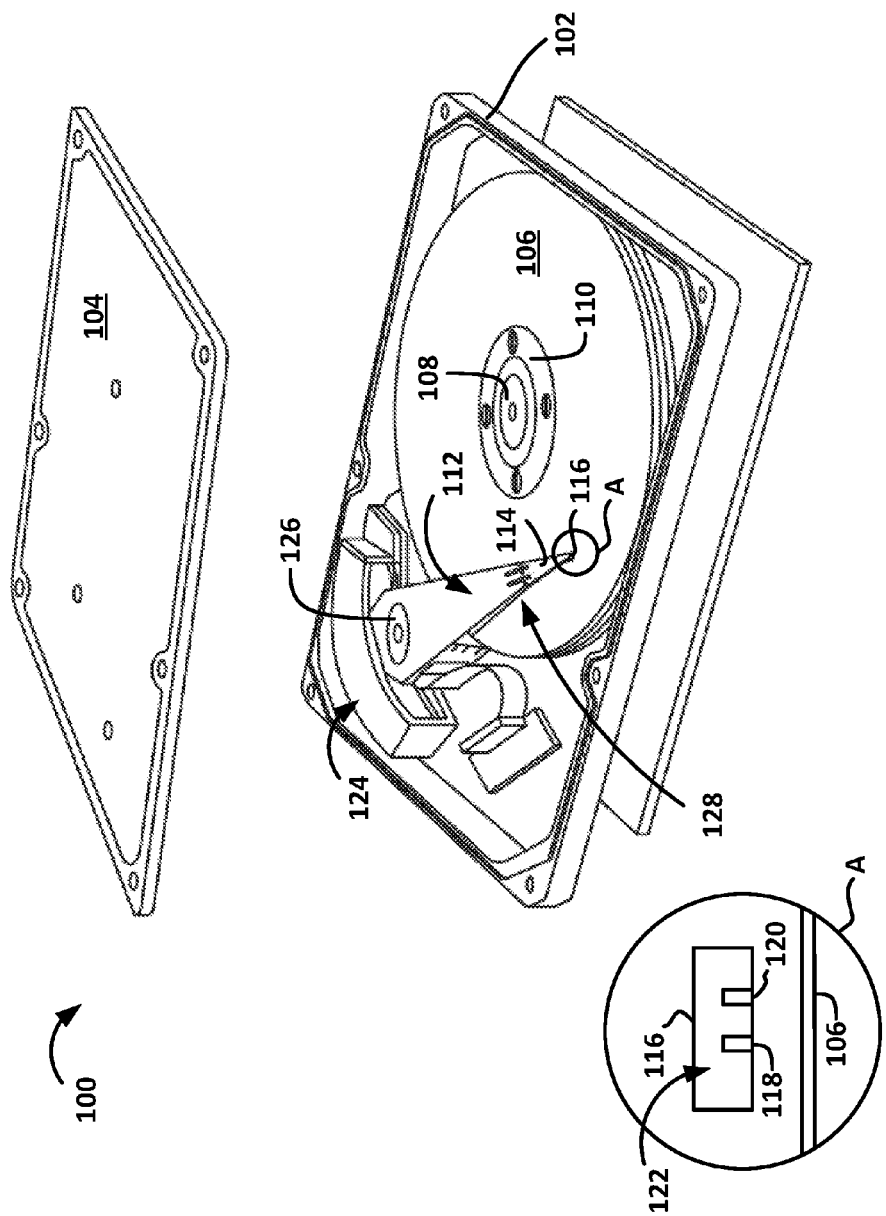
FIG. 1 shows an exploded, perspective view of a hard drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

FIG. 1 shows an exploded, perspective view of a hard drive 100 having a base deck 102 and top cover 104. The hard drive 100 includes magnetic recording discs 106 coupled to a spindle motor 108 by a disc clamp 110. The hard drive 100 also includes an actuator assembly 112 coupled to a suspension assembly 114 that suspends read/write heads 116 (only one read/write head 116 is shown in FIG. 1) over the magnetic recording discs 106. As shown in inset A—a close-up view of the read/write head 116 positioned above the magnetic recording disc 106—the read/write head 116 may include multiple transducers, including write elements 118 that write data to data tracks of the magnetic recording discs 106 and read elements 120 that read data from the data tracks (hereinafter the write and read elements 118, 120 are referred to interchangeably as the transducer 122). In operation, the spindle motor 108 rotates the magnetic recording discs 106 while the actuator assembly 112 is driven by a voice coil motor assembly 124 that rotates the actuator assembly 112 around a pivot bearing 126. The actuator assembly 112 also includes a microactuator 128 positioned at least partially on or between the suspension assembly 114 and the read/write head 116. The hard drive 100 further includes a servo control system that controls the voice coil motor assembly 124 and the microactuator 128 to position the read/write heads 116 (and therefore the transducer 122) over a desired track on the magnetic recording discs 106 for reading and writing operations.

Figure 2:
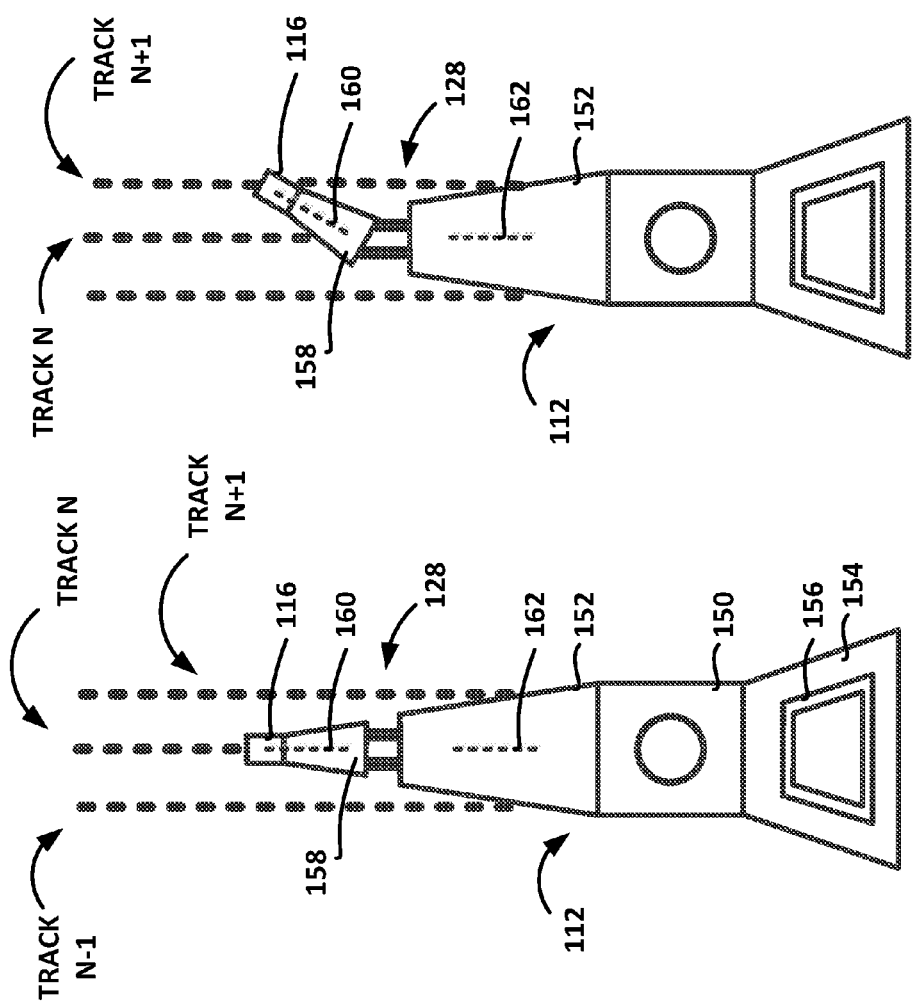
FIGS. 2A-C show a top, schematic view of an actuator assembly of the hard drive of FIG. 1.

FIGS. 2A-2C show a top, schematic view of an actuator assembly 112 at various time periods before, during, and after a track seeking operation where the transducer 122 is transitions from one track to another. The actuator assembly 112 has an actuator body portion 150 from which a plurality of arms 152 (only the top arm is shown in FIGS. 2A-2C) and a voice coil shelf 154 extend from the actuator body 150. The voice coil shelf 154 is coupled to a voice coil 156, which may include a wound conductive wire through which current is applied. In operation, positioning of the actuator assembly 112 is controlled by the applied current through the coil 156 which generates a magnetic field that interacts with magnetic fields of permanent magnets (not shown) of the voice coil motor assembly 124 and that are spaced apart from the coil 156. The arm 152 is shown as being proximal to the actuator body portion 150 and coupled to a suspension 158 (distal to the actuator body portion 150) by the microactuator 128. However, it is appreciated that the microactuator 128 may be positioned anywhere on or between a read/write head 116 and the actuator body portion 150. For example, the microactuator 128 may be positioned between the suspension 158 and a read/write head 116. In certain embodiments, the suspension 158 is separated into multiple sections and the microactuator 128 may be positioned between the multiple sections. Moreover, the actuator assembly 112 may include multiple sets of microactuators 128. For example, the hard drive 100 may utilize a dual- or triple-stage actuation system, which may refer to a number of actuation systems (e.g., voice coil motor assembly, microactuators) used by the hard drive 100 to position the transducer 122. The suspension 158 is coupled to the read/write head 116.

As previously mentioned, the voice coil motor assembly 124 (including the voice coil 156) and microactuator 128 are arranged to carry out various positioning operations (e.g., track seeking, track settling, track following) that position the read/write heads 116 (and therefore the transducer 122) over a desired track (e.g., N−1, N, N+1) of the magnetic recording disc 106 to read data from or write data to the desired track of the magnetic recording disc 106. For example, in response to a command to read data from or write data to a track different from where the transducer 122 is currently positioned (i.e., a track seeking operation), a current may be applied to the voice coil 156 of the voice coil motor assembly 124 to rotate the actuator assembly 112 (and therefore the transducer) towards the desired track. As the transducer 122 nears the desired track, the microactuator 128 may be activated to assist the voice coil motor assembly 124 with settling over the desired track (i.e., a track settling operation). For example, the microactuator 128 can include elements formed of lead-zirconate-titanate (PZT) and, as such, may extend (e.g., lengthen) in response to a positive applied voltage or contract (e.g., shorten) in response to a negative applied voltage. In certain configurations, when one of the PZT elements extends and the other PZT element shortens or maintains its length, the read/write head 116 will pivot. FIG. 2B, discussed in more detail below, shows an example of the read/write head 116 pivoting in response to voltage being applied to the microactuator 128. Once the transducer 122 is positioned over the desired track, the microactuator 128 may be used to compensate for small positioning errors to keep the transducer 122 over the desired track (i.e., a track following operation).

Figure 3:
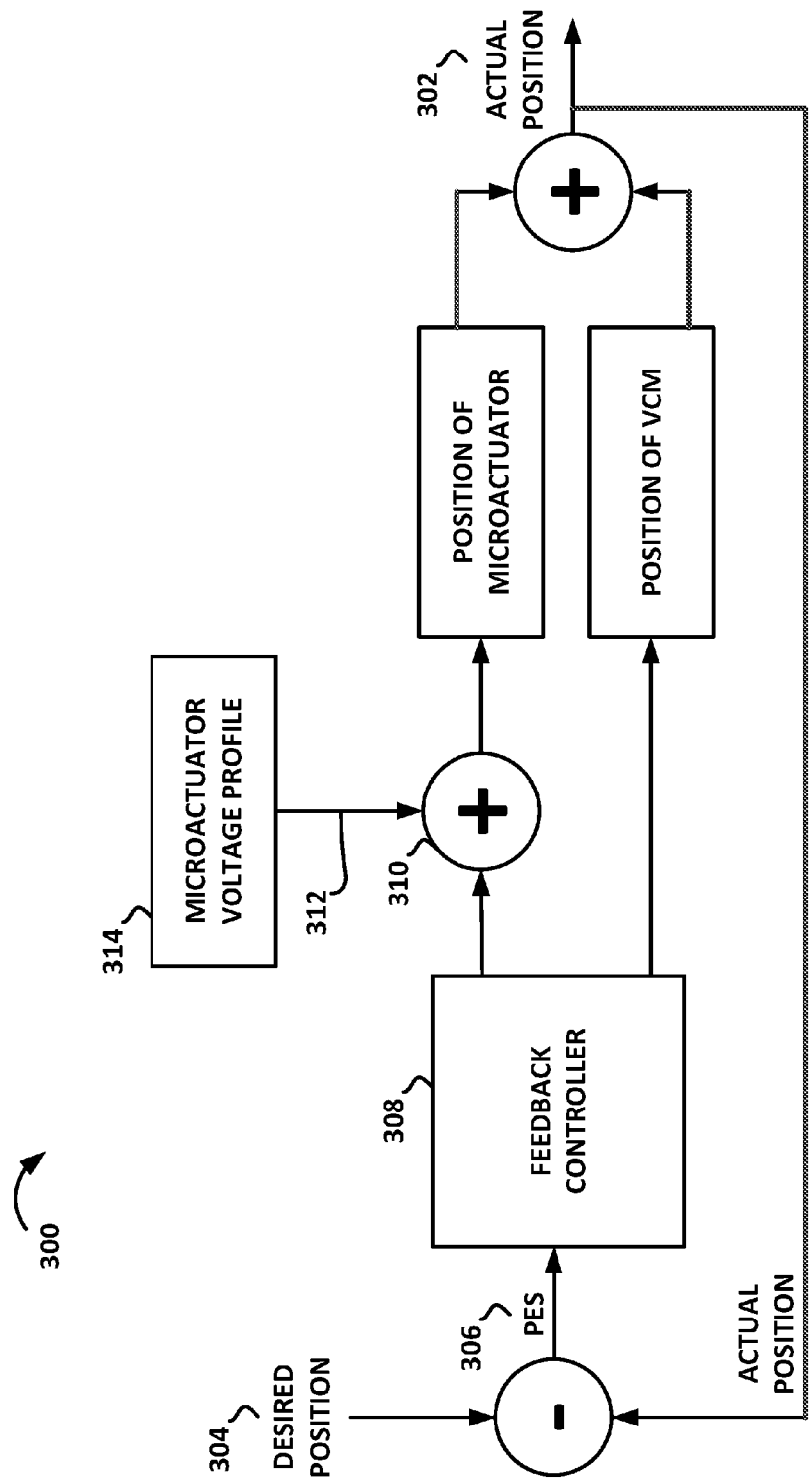
FIG. 3 shows a diagram of a servo control system, in accordance with certain embodiments of the present disclosure.

FIG. 3 provides a high-level representation of a servo control system 300. In operation, the read/write heads 116 read servo data (e.g., positioning data) embedded on the magnetic recording discs 106 to determine an actual position 302 of the transducer 122 relative to tracks on the magnetic recording discs 106. The actual position 302 of the transducer 122 is subtracted from a desired position 304 of the transducer 122 to determine a position error signal (PES) 306, which is the difference between where the transducer 122 is and should be positioned. The PES 306 is fed into a feedback controller 308, which controls current to the voice coil motor assembly 124 and—for some operations—controls voltage to the microactuators 128 to position the transducer 122 over the desired track. The servo control system 300 includes an adder 310 that injects a feedforward signal 312 to the microactuators 128 to further control a position of the transducer 122 to the desired track. The feedforward signal 312 and microactuator voltage profile 314 (e.g., applied voltage over time), discussed in more detail below, are useful in assisting with carrying out certain transducer-positioning operations, such as those shown in FIGS. 2A-C, to accomplish data reading and/or writing operations such as sequential reading and writing operations.

FIGS. 2A-2C show the actuator assembly 112 at various time periods during a track seeking operation where the read/write head 116 (and therefore the transducer 122) seeks from a first track N to an adjacent track N+1. Short seek operations may be useful for carrying out sequential read and write operations, which refer to reading or writing data to tracks in a contiguous manner. Although FIGS. 2A-C show the transducer 122 being positioned from a first track (e.g., track N) to an immediately adjacent track (e.g., track N+1), it is appreciated that the disclosure may be useful for seeking operations involving seeks greater than single-track seeks (e.g., track N to track N+10, track N to track N+5, track N to track N-2) on either side of track N.

Figure 4:
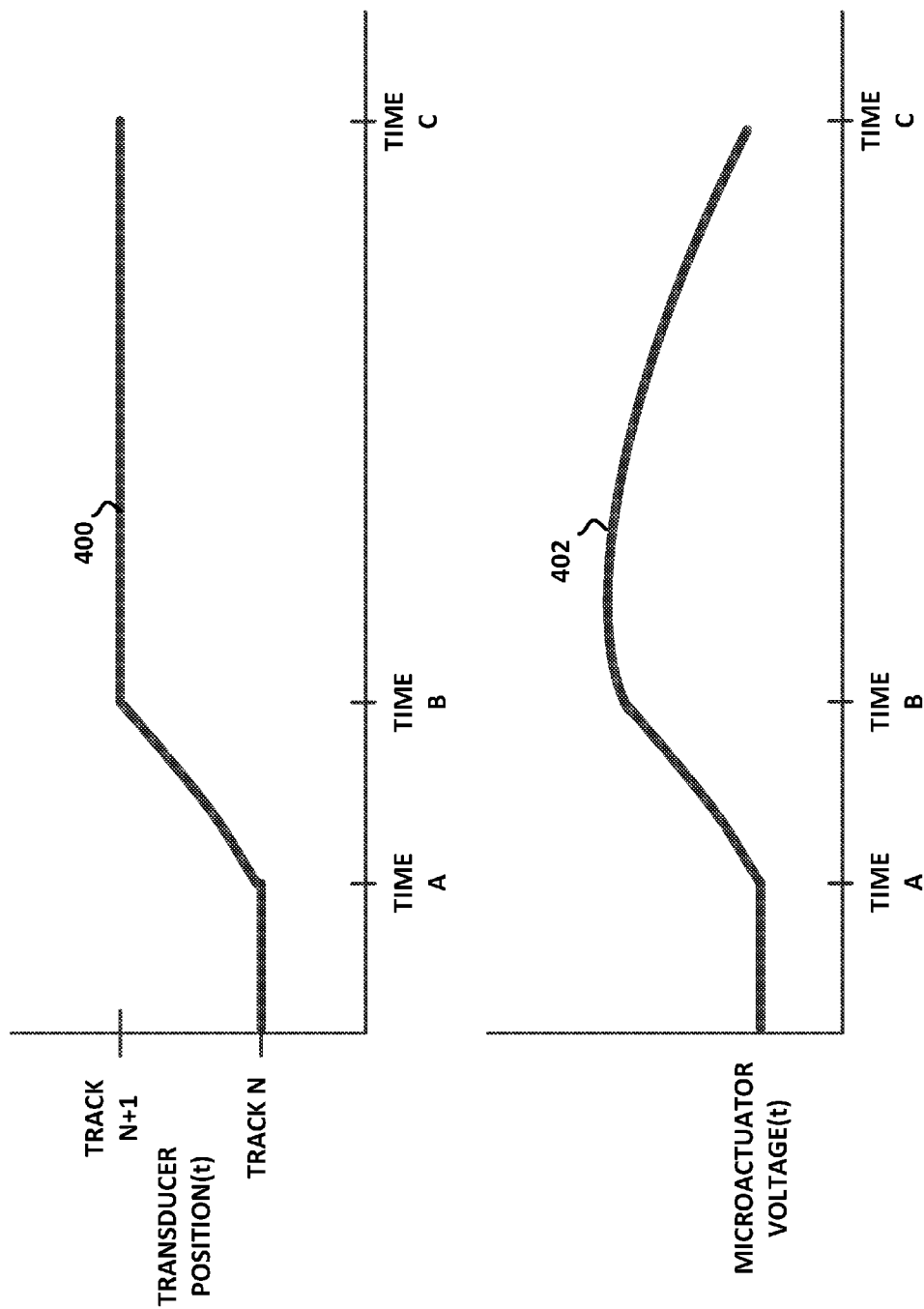
FIG. 4 shows plots of voltage and position as a function of time, in accordance with certain embodiments of the present disclosure.

FIG. 2A shows the read/write head 116 positioned over track N of the magnetic recording medium 106. At this position, the transducer 122 of the read/write head 116 may be reading data from or writing data to track N of the magnetic recording medium 106. FIG. 2A also shows a longitudinal axis 160 of the read/write head 116 being generally aligned or parallel with a longitudinal axis 162 of the arm 152. FIG. 4 is a companion figure for FIGS. 2A-2C and shows plots of the transducer's position 400 and a voltage 402 applied to at least one of the microactuators 128 over time. Time A on FIG. 4 corresponds to the position of the transducer 122 as shown in FIG. 2A and the voltage applied to at least one of the microactuators 128 in FIG. 2A. Time B corresponds to the position of the transducer 122 as shown in FIG. 2B and voltage applied to at least one of the microactuators 128 in FIG. 2B. Time C corresponds to the position of the transducer 122 as shown in FIG. 2C and voltage applied to at least one of the microactuators 128 in FIG. 2C. At Time A, FIG. 4 shows that the transducer 122 is positioned over track N and that little to no voltage is being applied to either microactuator 128.

FIG. 2B shows the read/write head 116 (and therefore the transducer 122) positioned over track N+1 of the magnetic recording medium 106. FIG. 4 also shows that, at Time B, the transducer 122 is positioned over track N+1. FIG. 4 shows that during the time period between Time A and Time B, a voltage is applied the microactuator 128 which displaces a position of the transducer 122 such that the transducer 122 is positioned from track N to track N+1. In this manner, the microactuator 128 carries out the single-adjacent-track seeking operation—resulting in a seek operation that is completed quicker than if the voice coil motor assembly 124 was used to position the transducer 122. Utilizing the microactuator 128 to position the transducer 122 independent of the voice coil motor assembly 124 is quicker at least because utilizing the microactuator 128 involves moving less mass (e.g., only the suspension 158 positioned distal of the actuator body portion 150) as compared to positioning the entire actuator assembly 112. Quicker seek times can result in improved data access rates. For example, the hard drive 100 may be able to retrieve requested data faster when seek times are reduced. As shown in FIG. 2B, the longitudinal axis 160 of the read/write head 116 is not inline or not parallel with the longitudinal axis 162 of the arm 152.

Referring back to FIG. 3, the feedforward signal 312 represents the positioning signal (and therefore voltage profile) applied to the microactuator 128. For example, FIG. 4 shows a voltage profile in between Time A and Time B that is essentially a straight line where the voltage applied to the microactuator 128 is increased at the same rate. Although the voltage profile is shown as having essentially a single slope, it is appreciated that other voltage profiles may be used to carry out seeking operations. The voltage profile may differ from hard drive to hard drive and even from head to head within a single hard drive. For example, a voltage profile for a certain hard drive may be determined by a calibration routine in a factory before the hard drive is shipped to a customer. Voltage profiles may differ from hard drive to hard drive even though the hard drives go through the same calibration routine. Voltage profiles may also differ depending on the seek operation (e.g., single-track seek, multi-track seek).

While a feedforward signal is applied to the microactuators 128, the voice coil motor assembly 124 may continue to be positioned by the feedback controller 208, which utilizes the PES 306. For example, once the transducer 122 is positioned over the desired track (e.g., N+1), the feedback controller 308 will act to control a position of the actuator assembly 112 through the voice coil motor assembly 124 by compensating for positioning errors at track N+1 as the feedback controller 308 would normally function.

FIG. 2C shows the read/write 116 positioned over track N+1 of the magnetic recording medium 106. FIG. 2C also shows the longitudinal axis 160 of the read/write head 116 being generally aligned or in parallel with the longitudinal axis 162 of the arm 152. FIG. 4 shows that during the time period between Time B and Time C, the transducer 122 maintains its position over track N+1. Also during such time period, voltage applied to at least one of the microactuators 128 is decreased until eventually returning to zero. The voltage (and therefore displacement of at least one of the microactuators 128) decreases because the voice coil motor assembly 124 is actuated to rotate the arm 152 (e.g., section proximal the actuator body portion 150) towards track N+1 such that the microactuator 128 no longer needs to be used to position the transducer 122 over track N+1.

It is appreciated that the steps and voltage profiles shown in FIGS. 2A-C and 4 can be reversed. For example, in anticipation of a command to read data from an adjacent track, a current could be applied to the voice coil 156 to rotate the arm 152 towards the adjacent track while voltage applied to the microactuators 128 is gradually increased such that the microactuators 128 enable the transducer 122 to maintain its position over track N. The voltage applied to the microactuator 128 could be quickly reduced to zero such that the transducer 122 is positioned over the adjacent track N+1.

It is also appreciated that multiple adjacent-track operations, like the ones described above, can be carried out in parallel. For example, the microactuator 128 and a read/write head 116 positioned on one side of a magnetic recording disc 106 could be performing an adjacent-track operation while a separate microactuator or group of microactuators and a read/write head could simultaneously perform an adjacent-track operation of their own either on the same magnetic recording disc 106 or another magnetic recording disc.

It is also appreciated that voltage profiles can be stored in various storage memory circuitry. Moreover, various components and/or functions of the servo control system 300 may take the form of firmware and/or microprocessor circuitry, including driver circuitry for the microactuators 128 and the voice coil motor assembly 124.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method for positioning a transducer over a magnetic recording medium having a plurality of tracks, the method comprising:
   positioning the transducer over a first track using a voice coil motor (VCM) and a microactuator;
   applying a feedforward voltage profile to the microactuator to position the transducer over a second track; and
   after positioning the transducer over the second track, actuating the VCM to move an arm of an actuator assembly towards the second track while reducing an amount of voltage applied to the microactuator.

2. The method of claim 1, wherein the second track is one to ten tracks away from the first track.

3. The method of claim 2, wherein the second track is one to five tracks away from the first track.

4. The method of claim 3, wherein the second track is immediately adjacent the first track.

5. The method of claim 1, wherein voltage applied to the microactuator is increased at a constant rate.

6. The method of claim 1, wherein the amount of voltage applied to the microactuator is reduced to zero while the transducer maintains position over the second track.

7. The method of claim 1, wherein the VCM is controlled by a feedback controller.

8. A hard drive comprising:
   an actuator assembly including an arm;
   a microactuator coupled between the arm and a transducer; and
   circuitry configured to position the transducer during a seek operation by applying a feedforward voltage that is increased at a constant rate to the microactuator.

9. The hard drive of claim 8, further comprising:
   a magnetic recording medium having a first track and a second track,
   wherein the circuitry is configured to position the transducer from the first track to the second track during the seek operation by applying the feedforward voltage to the microactuator.

10. The hard drive of claim 9, wherein the first track and the second track are immediately adjacent to each other.

11. The hard drive of claim 9, wherein the feedforward voltage is not applied to a voice coil motor.

12. The hard drive of claim 8, wherein the applied feedforward voltage comprises a predetermined voltage profile.

13. The hard drive of claim 12, wherein the predetermined voltage profile is stored in a memory.

14. The hard drive of claim 8, wherein the circuitry is further configured to, upon positioning the transducer during the seek operation, reducing the voltage applied to the microactuator.

15. The hard drive of claim 14, further comprising:
   a voice coil motor assembly including a coil coupled to the actuator assembly and at least one permanent magnetic spaced from the coil.

16. The hard drive of claim 15, further comprising:
   a feedback controller configured to control a current applied to the coil to position the actuator assembly.

17. The hard drive of claim 16, wherein the feedback controller corrects for a position error signal.

18. A method for positioning a transducer over a magnetic recording medium having a plurality of tracks, the method comprising:
   positioning the transducer over a first track using a voice coil motor (VCM) and a microactuator;
   actuating the VCM to move an arm of an actuator assembly towards a second track while increasing a voltage applied to the microactuator such that the transducer remains positioned over the first track while the arm moves towards the second track; and
   reducing the voltage applied to the microactuator to position the transducer over the second track.

19. The method of claim 18, wherein the voltage applied to the microactuator is reduced to zero to position the transducer over the second track.

20. The method of claim 19, wherein the voltage applied to the microactuator is a predetermined voltage profile stored in a memory.

\* \* \* \* \*